US011124316B2

(12) United States Patent
Nielsen

(10) Patent No.: US 11,124,316 B2
(45) Date of Patent: Sep. 21, 2021

(54) DETECTING IMPENDING MOTOR FAILURE USING AUDIO DATA

(71) Applicant: WING Aviation LLC, Mountain View, CA (US)

(72) Inventor: Christian Nielsen, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 213 days.

(21) Appl. No.: 16/358,555

(22) Filed: Mar. 19, 2019

(65) Prior Publication Data

US 2020/0299002 A1 Sep. 24, 2020

(51) Int. Cl.
| | |
|---|---|
| *B64C 39/02* | (2006.01) |
| *B64F 1/22* | (2006.01) |
| *B64F 5/60* | (2017.01) |
| *G01H 1/00* | (2006.01) |
| *G01H 3/08* | (2006.01) |
| *G01H 3/10* | (2006.01) |

(Continued)

(52) U.S. Cl.
CPC .................. *B64F 5/60* (2017.01); *G01H 3/08* (2013.01); *G01M 13/00* (2013.01); *G07C 5/0808* (2013.01); *B64C 39/024* (2013.01)

(58) Field of Classification Search
CPC ........ B64C 2201/042; B64C 2201/108; B64C 2201/165; B64C 2201/20; B64C 39/024; B64F 1/222; B64F 5/60; G01H 1/006; G01H 3/10; G01H 3/08; G07C 5/0808; G01M 13/00
See application file for complete search history.

(56) References Cited

U.S. PATENT DOCUMENTS

| | | | |
|---|---|---|---|
| 6,775,642 B2 | 8/2004 | Remboski et al. | |
| 9,415,870 B1 * | 8/2016 | Beckman | B64C 39/024 |

(Continued)

FOREIGN PATENT DOCUMENTS

| | | |
|---|---|---|
| CN | 105808957 A | 7/2016 |
| CN | 106774381 A | 5/2017 |
| KR | 1020180000909 A | 1/2018 |

OTHER PUBLICATIONS

Passow, Nils Benjamin, "Fusion of Intelligent Control and Acoustic Sensing for an Autonomous Helicopter" De Montfort University, Jun. 2011, 254 pages.

(Continued)

*Primary Examiner* — Abby Y Lin
*Assistant Examiner* — Hossam M Abd El Latif
(74) *Attorney, Agent, or Firm* — Christensen O'Connor Johnson Kindness PLLC

(57) ABSTRACT

In an embodiment, one or more computer-readable storage medium comprising a plurality of instructions to cause an apparatus, in response to execution by one or more processors of the apparatus, to receive sounds emanating from one or more motors included in an unmanned aerial vehicle (UAV) during operation of the one or more motors; predict a number of operational cycles remaining before the one or more motors is to fail based on analysis of the sounds; and, based on the determination of the number of operational cycles remaining, restrict the UAV from normal use. The one or more motors comprises a vertical or horizontal propulsion motor of the UAV.

20 Claims, 11 Drawing Sheets

(51) Int. Cl.
    *G01M 13/00*     (2019.01)
    *G07C 5/08*     (2006.01)

(56) References Cited

U.S. PATENT DOCUMENTS

| | | |
|---|---|---|
| 9,937,808 B2 | 4/2018 | Evans |
| 10,370,093 B1* | 8/2019 | Beckman ............. G08G 5/0021 |
| 2009/0069956 A1 | 3/2009 | Taya et al. |
| 2014/0074345 A1* | 3/2014 | Gabay ..................... G07C 5/08 |
| | | 701/31.4 |
| 2017/0175746 A1* | 6/2017 | Mayleben ............... F04D 13/14 |
| 2017/0329602 A1* | 11/2017 | Wang .................. G06F 16/2455 |
| 2018/0284773 A1* | 10/2018 | Pratt .................... G05D 1/0094 |
| 2019/0002127 A1 | 1/2019 | Straus et al. |
| 2019/0152620 A1* | 5/2019 | Chen .................... G08B 21/182 |
| 2020/0062378 A1* | 2/2020 | Li ......................... G05D 1/101 |

OTHER PUBLICATIONS

International Search Report and Written Opinion, dated Jun. 1, 2020, in corresponding International Patent Application No. PCT/US2020/015712, 11 pages.

\* cited by examiner

DETECTING IMPENDING MOTOR FAILURE USING AUDIO DATA

TECHNICAL FIELD

This disclosure relates generally to electric motors, and in particular but not exclusively, relates to use of electric motors in unmanned vehicles.

BACKGROUND INFORMATION

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Propulsion of unmanned vehicles may occur using, for example, electric motors. Electric motors may also be used in connection with payload handling by the unmanned vehicles. Designs that improve reliability of unmanned vehicle propulsion and/or payload handling will expand their mission capabilities.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method for automatic detection of operational states of electric motors included in unmanned aerial vehicles are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments described herein include an unmanned aerial vehicle (UAV), which refers to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

Figure 1A:
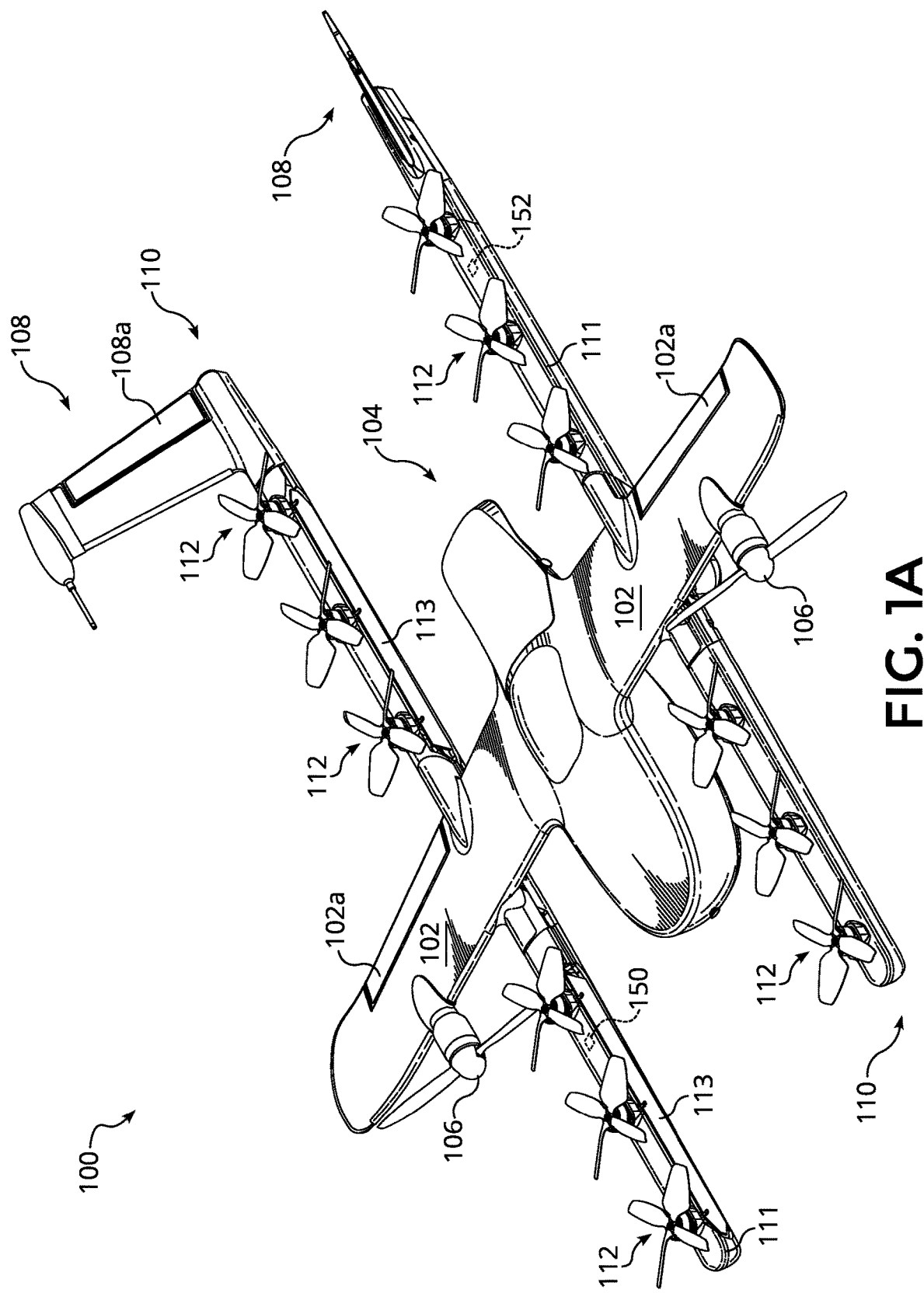
FIG. 1A is a perspective top view illustration of an unmanned aerial vehicle (UAV), in accordance with an embodiment of the present disclosure.
Figure 1B:
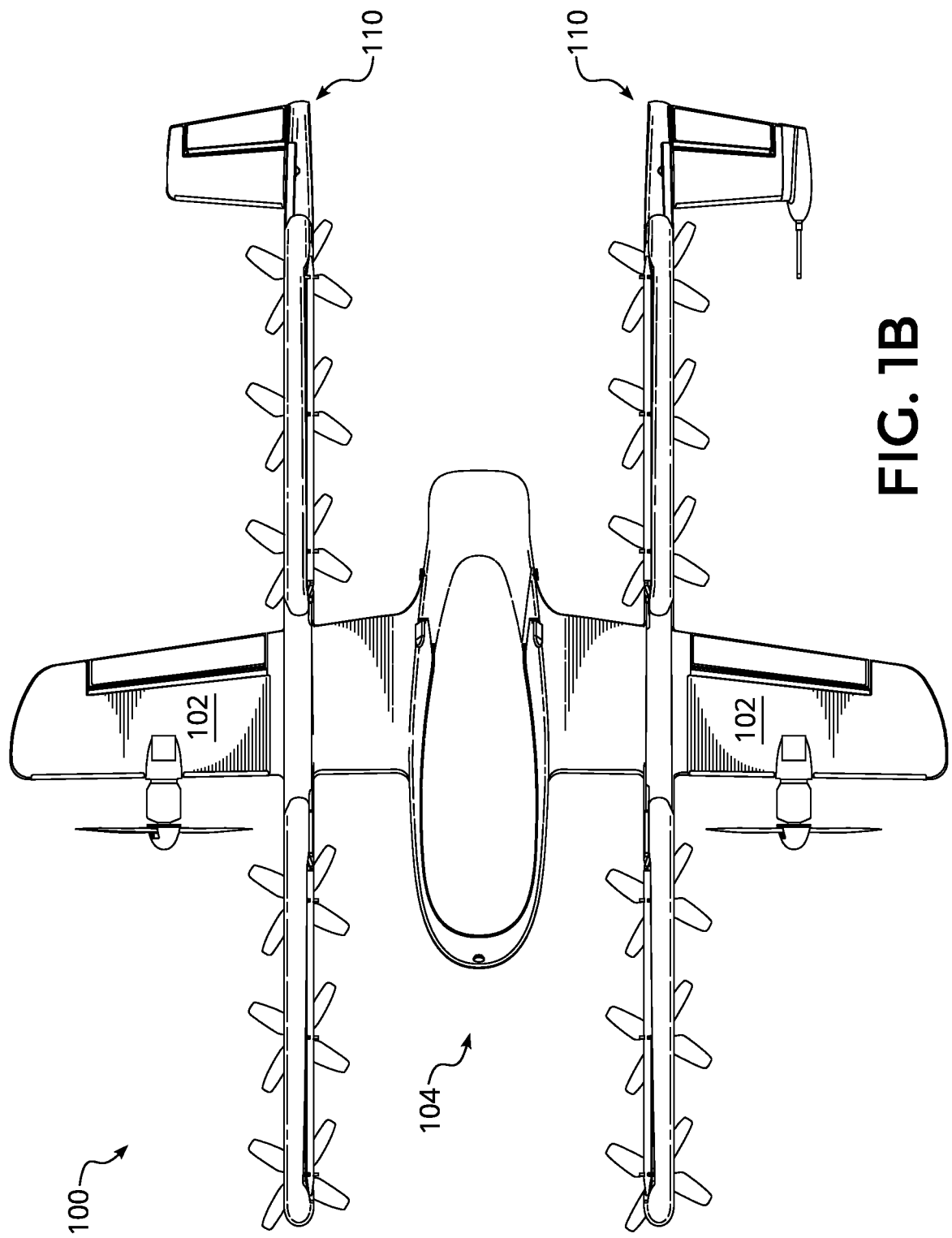
FIG. 1B is a bottom side plan view illustration of the UAV, in accordance with an embodiment of the present disclosure.

FIGS. 1A and 1B illustrate an aerial vehicle or UAV 100, in accordance with an embodiment of the present disclosure. The illustrated embodiment of UAV 100 is a vertical takeoff and landing (VTOL) unmanned aerial vehicle (UAV) that includes separate propulsion units 106 and 112 for providing horizontal and vertical propulsion, respectively. UAV 100 is a fixed-wing aerial vehicle, which as the name implies, has a wing assembly 102 that can generate lift based on the wing shape and the vehicle's forward airspeed when propelled horizontally by propulsion units 106. FIG. 1A is a perspective top view illustration of UAV 100 while FIG. 1B is a bottom side plan view illustration of UAV 100.

The illustrated embodiment of UAV 100 includes a fuselage 104. In one embodiment, fuselage 104 is modular and includes a battery module, an avionics module, and a mission payload module. These modules are detachable from each other and mechanically securable to each other to contiguously form at least a portion of the fuselage or UAV main body.

The battery module includes a cavity for housing one or more batteries for powering UAV 100. The avionics module houses flight control circuitry of UAV 100, which may include a processor and memory, communication electronics and antennas (e.g., cellular transceiver, Wi-Fi transceiver, etc.), and various sensors (e.g., global positioning sensor, an inertial measurement unit (IMU), a magnetic compass, etc.). The mission payload module houses equipment associated with a mission of UAV 100. For example, the mission payload module may include a payload actuator for holding and releasing an externally attached payload. In another embodiment, the mission payload module may include a camera/sensor equipment holder for carrying camera/sensor equipment (e.g., camera, lenses, radar, LIDAR, pollution monitoring sensors, weather monitoring sensors, etc.).

The illustrated embodiment of UAV 100 further includes horizontal propulsion units 106 positioned on wing assembly 102, which can each include a motor, shaft, motor mount, and propeller, for propelling UAV 100. The illustrated embodiment of UAV 100 includes two boom assemblies 110 that secure to wing assembly 102. In one embodiment, wing assembly 102 includes a wing spar 203 (see FIG. 2) disposed within a wing foil of wing assembly 102. Wing spar 203 may be a hollow structural member (e.g., tubular rod) extending along the internal length of the wing foil and provides a main structural member that connects wing assembly 102 to fuselage 104 and to which boom assemblies 110 mount.

The illustrated embodiments of boom assemblies 110 each include a boom housing 111 in which a boom 214 (see FIG. 2) is disposed, vertical propulsion units 112, printed circuit boards 113, and stabilizers 108. In the illustrated embodiment, booms 214 are also hollow structural members (e.g., tubular rods) that provide the main structural support to which wing spar 103 and vertical propulsion units 112 are mounted. Booms 214 are also referred to as "boom carriers" since they carry the load forces on boom assemblies 110. Vertical propulsion units 112 can each include a motor, shaft, motor mounts, and propeller, for providing vertical propulsion. Vertical propulsion units 112 may be used during a hover mode where UAV 100 is descending (e.g., to a delivery location) or ascending (e.g., following a delivery). Stabilizers 108 (or fins) may be included with UAV 100 to stabilize the UAV's yaw (left or right turns) during flight. In some embodiments, UAV 100 may be configured to function as a glider. To do so, UAV 100 may power off its propulsion units and glide for a period of time.

During flight, UAV 100 may control the direction and/or speed of its movement by controlling its pitch, roll, yaw, and/or altitude. For example, the stabilizers 108 may include one or more rudders 108a for controlling the UAV's yaw, and wing assembly 102 may include elevators for controlling the UAV's pitch and/or ailerons 102a for controlling the UAV's roll. As another example, increasing or decreasing the speed of all the propellers simultaneously can result in UAV 100 increasing or decreasing its altitude, respectively.

Many variations on the illustrated fixed-wing aerial vehicle are possible. For instance, aerial vehicles with more wings (e.g., an "x-wing" configuration with four wings), are also possible. Although FIGS. 1A and 1B illustrate one wing assembly 102, two boom assemblies 110, two horizontal propulsion units 106, and six vertical propulsion units 112 per boom assembly 110, it should be appreciated that other variants of UAV 100 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 2:
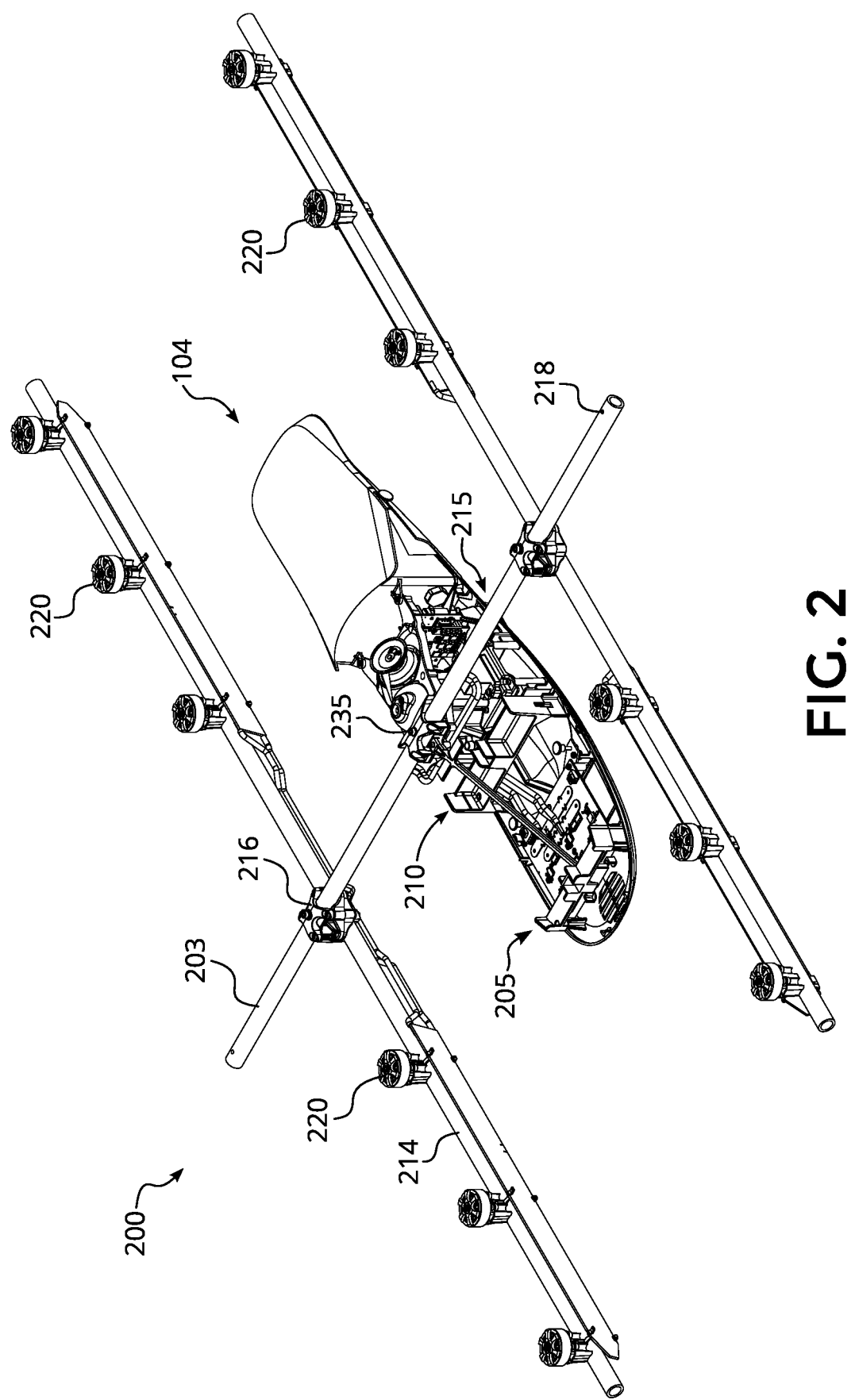
FIG. 2 is a perspective view illustration of a structural airframe the UAV, in accordance with an embodiment of the present disclosure.

FIG. 2 is a perspective view illustration of a structural airframe 200 (also referred to as a "structural H-frame" or an "H-frame") of UAV 100, in accordance with an embodiment of the present disclosure. H-frame 200 includes wing spar 203 and booms 214. In some embodiments wing spar 203 and booms 214 may be made of carbon fiber, hard plastic, aluminum, light metal alloys, or otherwise. Wing spar 203 and booms 214 are mechanically connected with spar-boom joiners 216. Spar-boom joiners 216 are mechanical joiners that clamp wing spar 103 to booms 214 with a "frangible" design. Wing spar 203 may include pre-drilled holes 218 for mounting horizontal propulsion units 106, and boom carriers 214 may include pre-drilled holes (hidden by motor mounts 220) for mounting vertical propulsion units 112. In the illustrated embodiment, fuselage 104 is removably attached to the H-frame with a spar joiner 235 that clamps onto wing spar 203.

Mechanical joiners 216 and/or 235 may be frangible structures designed to break apart to decouple the kinetic energy between linked structures in the event of a catastrophic impact or crash landing. This controlled failure mode improves safety and reduces property damage in the event of crash landings of UAV 100 by diverting impact energy way from booms 214 and/or wing spar 203.

In an embodiment, fuselage 104 comprises a modular fuselage including a battery module 205 for housing a battery to power a UAV, a mission payload module 210 that houses equipment associated with a mission of the UAV, and an avionics module 215 for housing flight control circuitry of the UAV. Battery module 205, mission payload module 210, and avionics module 215 are shaped to secure to each other to form a contiguous and operational fuselage separate from being mechanically secured to wing assembly 102 or boom assemblies 110. This enables modular fuselage 104 to be assembled and operationally tested in isolation to the aerodynamic structures and systems on wing assembly 102 and boom assemblies 110. The modularity further enables the easy replacement of worn out or damaged modules, swapping modules (e.g., mission payload module) for a given UAV mission or flight, or updating particular modules without having to replace the entire UAV.

Figure 3A:
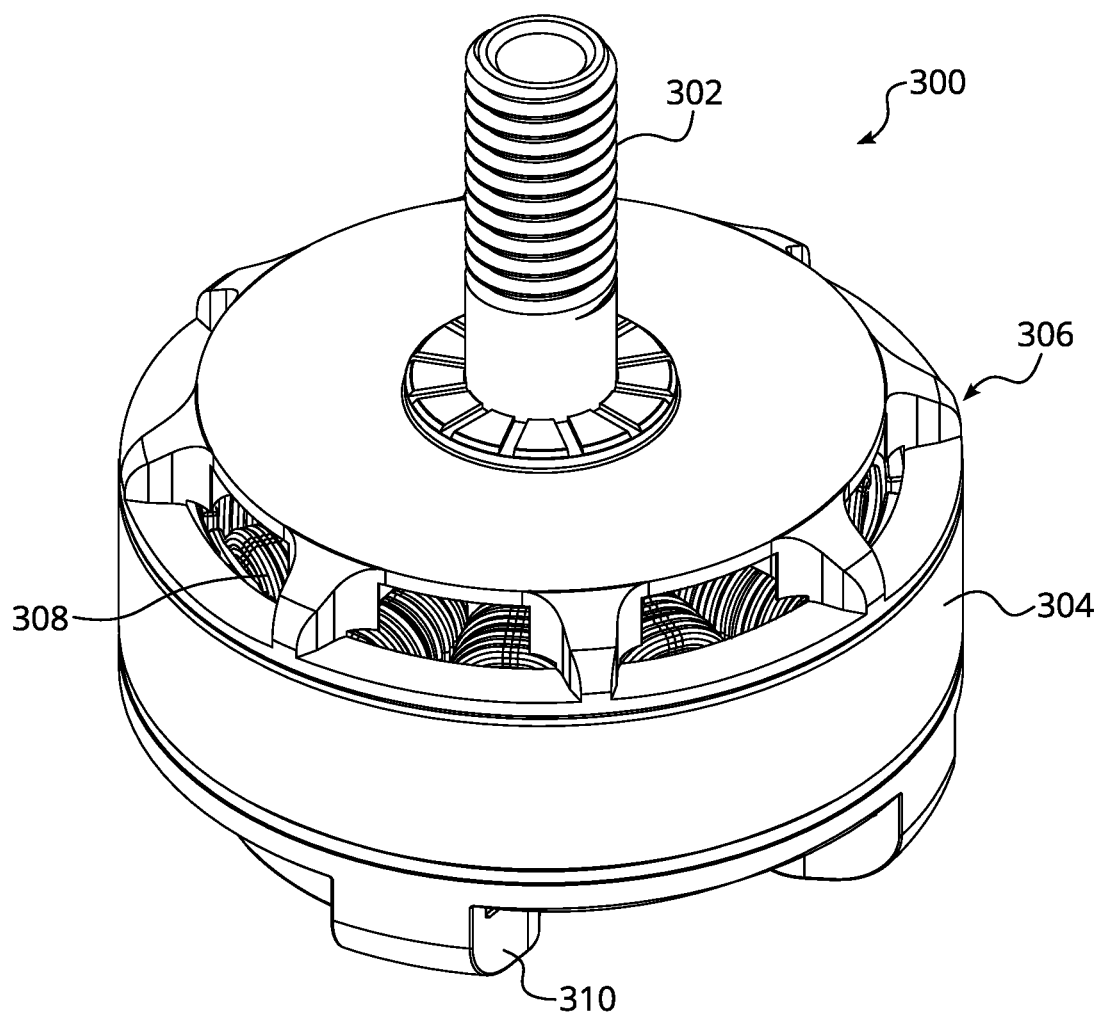
FIG. 3A is a perspective view illustration of a motor of the UAV, in accordance with an embodiment of the present disclosure.
Figure 3B:
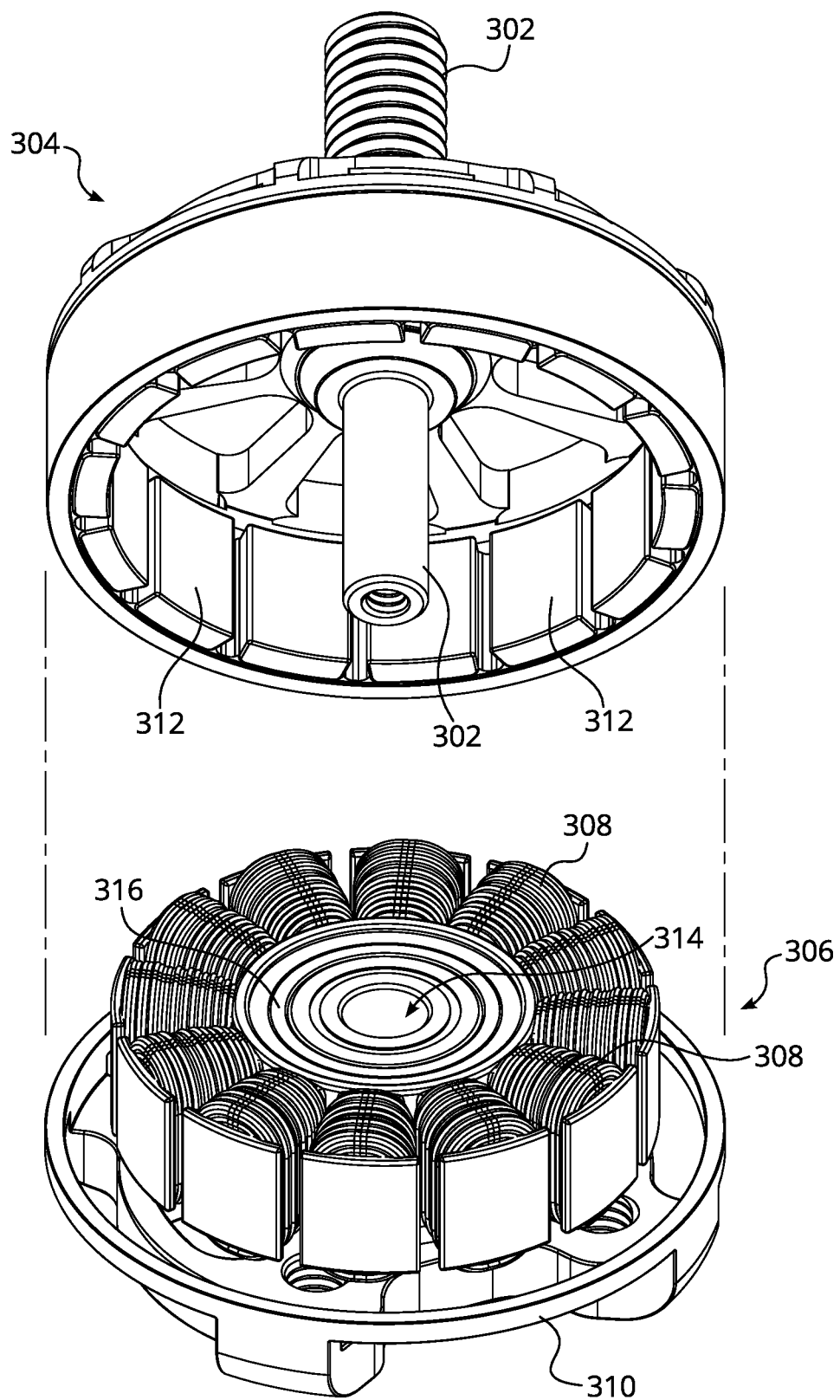
FIG. 3B is a partial, exploded perspective view illustration of the motor, in accordance with an embodiment of the present disclosure.

FIG. 3A is a perspective view illustration of a motor 300 of UAV 100, in accordance with an embodiment of the present disclosure. FIG. 3B is a partial, exploded perspective view illustration of the motor 300, in accordance with an embodiment of the present disclosure. Motor 300 can be a motor included in the propulsion unit 106, propulsion unit 112, mission payload module 210, and/or the like of UAV 100. Motor 300 can comprise an electric motor, a brushless motor, a direct current (DC) motor, an alternating current (AC) motor, a brushed motor, or the like. Motors included in the UAV 100 can be the same or different from each other.

In an embodiment, a shaft 302 extends both above and below a first side (e.g., the top side) of the motor 300. A first portion of the shaft 302 above the first side is configured to physically couple with a propeller or other structure of UAV 100 to which mechanical power is to be applied or provided. A second portion of the shaft 302, opposite the first portion, is located below the first side within a rotor 304. A second side opposite the first side (e.g., the bottom side) of the motor 300 includes a base 310. Motor 300 further includes the rotor 304 and a stator 306. Rotor 304 is configured to be circumferential with, supported by, and cause to be rotated by the stator 306.

As shown in FIG. 3B, the second portion of the shaft 302 extends from a center of the rotor 304 and is configured to insert into a corresponding shaft receiving space 314 of the stator 306. Disposed between the rotor 304 and stator 306 are a plurality of bearings (not shown) located on a surface 316 of the stator 306. The inner sides of the rotor 304 (e.g., sides parallel to the axis of the shaft 302) include a plurality of magnets 312. The perimeter of the stator 306 (e.g., the sides parallel to the axis of the shaft 302) includes a plurality of copper windings 308. The plurality of magnets 312 is configured to be circumferential to and separated by a small gap from the plurality of copper windings 308.

Magnetic field generated by the plurality of copper windings 308 of the stator 306 causes the plurality of magnets 312 of the rotor 304 to rotate about the plurality of copper windings 308. Such rotation, in turn, rotates the rotor 304 overall as well as the shaft 302, thereby providing mechanical power to the structure physically coupled to the first portion of the shaft 302.

Figure 4:
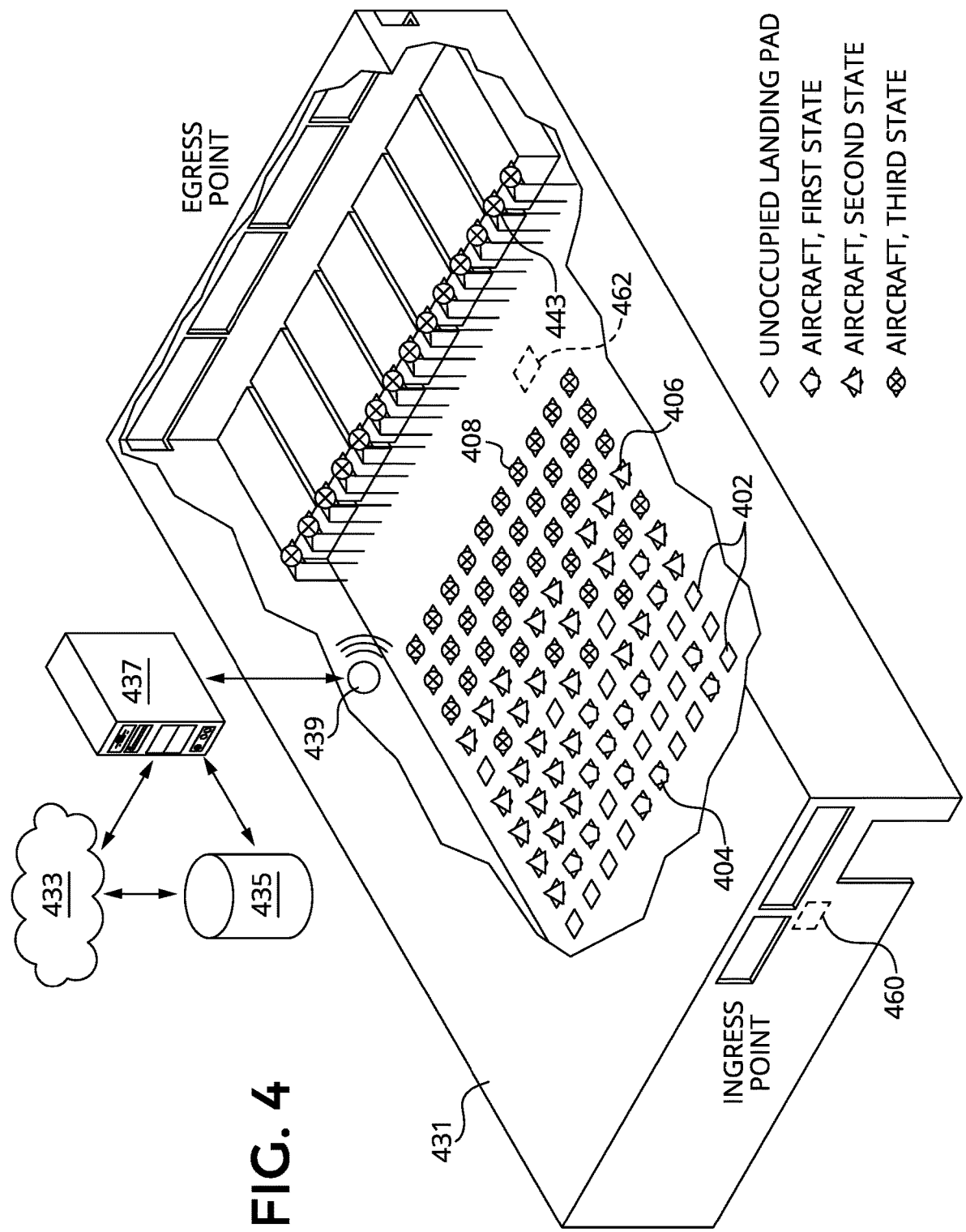
FIG. 4 illustrates an example storage facility for UAVs, in accordance with an embodiment of the present disclosure.

FIG. 4 illustrates an example storage facility for UAVs, in accordance with an embodiment of the present disclosure. One of skill in the art will appreciate that one or more components/features depicted in FIG. 4 can be omitted in accordance with various embodiments of the present disclosure.

FIG. 4 illustrates an enclosed storage facility 431 with separate ingress and egress points (e.g., windows that may open and close) on opposite sides of the structure. Also depicted are parts of a control system for the UAVs including a network 433, storage 435, controller or compute device 437 (e.g., servers in a distributed system, local computer, a combination thereof, or the like), and communication system 439 (e.g., radio frequency (RF) transceiver, Wi-Fi transceiver, Bluetooth, or the like). Charging pads 402-408 and staging area 443 are also depicted.

In an embodiment, charging pads 402 comprise unoccupied charging and/or landing pads that are available for UAVs to respectively be located. Charging pads 404, 406, and 408 comprise charging/landing pad locations at which UAVs in first, second, and third states, respectively, are located. UAVs located in the staging area 443 comprise UAVs designated for a particular action or activity. As an example, without limitation, UAVs in the first state comprise UAVs designated to be out of service, to be serviced, flagged for impending motor failure, and/or the like, as will be described in detail herein. UAVs in the second state comprise UAVs that are partially charged and which are undergoing battery charging (or other power replenishment) at charging pads 406. UAVs in the third state comprise UAVs that are fully charged. Staging area 443 can comprise UAVs that are ready for deployment for their intended purpose, UAVs selected for testing, and/or the like.

One or both of audio capture devices 460, 462 can also be included with the storage facility 431. Audio capture devices 460, 462 are configured to capture or receive sounds emanating from the UAVs entering, exiting, and/or within the storage facility 431. Sounds captured by audio capture devices 460, 462 comprise audio data that are provided to compute device 437 via communication system 439. Each of audio capture devices 460, 462 can comprise one or more audio capture devices located at one or more locations. Audio capture devices 460 and/or 462 can comprise part of a larger system such as a security system, audio visual system, and/or the like. Audio capture device 460 is located proximate the ingress point, egress point, and/or the like to capture sounds emanating from UAVs as they enter or exit the storage facility 431. Audio capture device 462 is located in proximity to the charging pads 402-408 to capture sounds emanating from UAVs within the storage facility 431. In some embodiments, if one of audio capture devices 460 or 462 is implemented, then the other of the audio capture devices 462 or 460 can be optional.

In the illustrated embodiment, the control system for the UAVs receives, via a receiver included in communication system 439, a status update, audio data, or other information from one or more of the UAVs. The control system may calculate with controller 437 moving instructions for one or more of the UAVs based on the received information. The control system may then send, using communication system 439, the movement instructions to the one or more UAVs, and the movement instructions include directions to move particular ones of the UAVs from a first location to a second location within storage facility 431.

For example, if UAV 100 located within the storage facility 431 includes one or more audio capture devices (e.g., microphones) that captures sounds or audio emanating from onboard motors of the UAV 100, the captured audio data can be provided to the control system. Movement instructions in response to captured audio data from UAV 100 can include, for instance, an instruction for UAV 100 to move to an area of the storage facility 431 designated for UAV servicing, UAV maintenance, UAVs designated not to be used for deliveries, and/or the like (e.g., to charging pads 404).

Movement instructions may be provided to rearrange the UAVs for the reasons described above. In some embodiments, audio data is analyzed and the control system may determine whether one or more motors of particular UAVs are experiencing impending failure, operating outside of normal parameters, number of operational cycles to motor failure, and/or the like. Actual motor failure may cause the UAVs to fail, UAVs to be unduly damaged, and/or otherwise adversely impact the UAVs' mission. Thus, moving instructions can be formulated that are proactive in nature, such as designating certain UAVs to be serviced or not to be used for normal operations and causing such designated UAVs to locate to charging pads 404 or other particular area(s) of the storage facility 431.

Although storage facility 431 is depicted with ingress and egress points located at different sides, it is contemplated that both the ingress and egress points can be located on the same side and/or comprise the same opening. Storage facility 431 can comprise an open area or a structure without a roof rather than the depicted enclosed structure. In which case ingress and egress points may be omitted.

Figure 5:
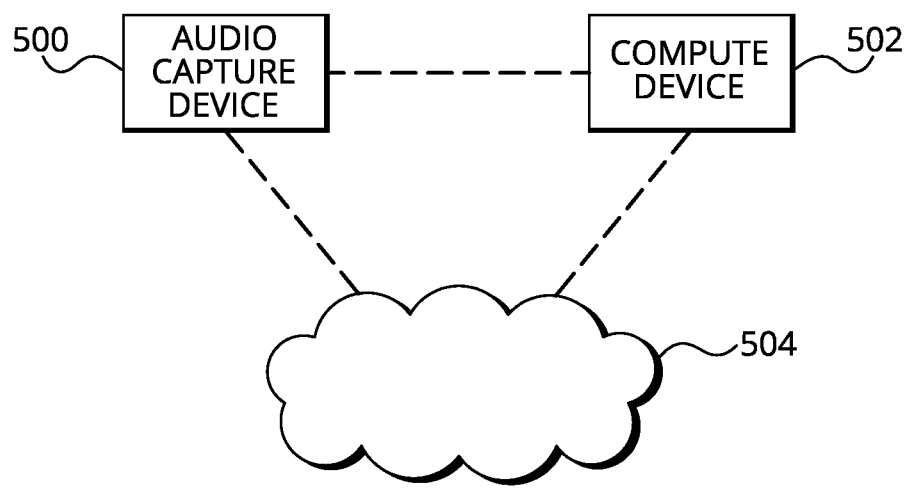
FIG. 5 illustrates a block diagram of devices implemented in connection with automatic motor failure detection and analysis in accordance with an embodiment of the present disclosure.

FIG. 5 illustrates a block diagram of devices implemented in connection with automatic motor failure detection and analysis in accordance with an embodiment of the present disclosure. An audio capture device 500 is in direct communication or indirect communication, via a network 504, with a compute device 502.

In an embodiment, audio capture device 500 is configured to capture, receive, and/or sense sounds emanating from or generated by one or more motors during operation (e.g., active state) of the one or more motors. The monitored motor(s) comprise a motor such as the motor 300, motor included in propulsion unit 106 of UAV 100, motor included in propulsion unit 112 of UAV 100, motor included in the payload module of UAV 100, and/or other motors of UAV 100.

Audio capture device 500 comprises one or more devices. Audio capture device 500 can comprise part of the UAV 100 and/or be external to the UAV 100. For example, without limitation, audio capture device 500 can comprise audio capture device 150 and/or 152 included on the exterior of the UAV 100 (see FIG. 1A), audio capture device 460 and/or 462 associated with storage facility 431, and/or the like. Audio capture device 500 can comprise a dedicated audio sensing device or be part of a system. For instance, audio capture device 500 can comprise a (dedicated) microphone, part of a security system, part of a security camera, part of an audio/visual system, part of an Internet of Things (IoT) device, and/or the like. In an embodiment, a given one of the audio capture device 500 is configured to capture audio from a particular one of the motor(s) of interest. In other embodiments, a given one of the audio capture device 500 is configured to capture audio from a plurality of motors, with audio associated with each respective motor of the plurality of motors from the total audio data collected to be identified by the compute device 502.

Compute device 502 is configured to receive audio data from the audio capture device 500 and perform processing, analysis, and/or determinations associated with detection of impending motor failure, as described in detail below in connection with FIGS. 6-8. In an embodiment, motor failure detection logic is included in compute device 502 to perform such processing, analysis, and/or determinations. Motor failure detection logic can be implemented as software comprising one or more instructions to be executed by one or more processors included in compute device 502 (and/or a remotely located server/compute device if compute device 502 is resource constrained or processing is to be performed remotely or by a central processing unit). In alternative embodiments, motor failure detection logic (or a portion thereof) may be implemented as firmware or hardware such as, but not limited to, an application specific integrated circuit (ASIC), programmable array logic (PAL), field programmable gate array (FPGA), and the like included in the compute device 502 (and/or remotely located server/compute device).

Compute device 502 comprises one or more devices, and is located proximate or distal from the audio capture device 500 from which audio data is to be received. Compute device 502 can comprise part of the UAV 100 and/or be separate from the UAV 100. For example, without limitation, compute device 502 comprises a processor included in the avionics module of the UAV 100, a processor included in the UAV 100, the controller or compute device 437, a central remote processor, and/or the like. Compute device 502 comprises one or more computers, workstations, servers, laptops, processors, smartphones, tablets, and/or the like. Compute device 502 can comprise a device dedicated for detection of motor failure and associated functionality, or a device that is a part of a system and/or configured to perform motor failure detection as well as other processing functions.

In an embodiment, audio capture device 500 and compute device 502 may be the same or different devices from each other. In an embodiment, each audio capture device 500 is associated with a particular compute device 502. In an embodiment, a single compute device 502 is configured to receive audio data from more than one of the audio capture devices 500. In other words, the number of audio capture devices 500 to the number of compute devices 502 for the UAV 100 can be one to one, one to many, or many to one. The number of audio capture devices 500 to the number of compute devices 502 for a plurality of UAVs, such as may be handled by the storage facility 431, is likewise one to one, one to many, or many to one.

Network 504 comprises one or more switches, routers, firewalls, gateways, relays, repeaters, interconnects, network management controllers, servers, memory, processors, and/or other components configured to interconnect and/or facilitate communication between audio capture device 500 and compute device 502. The network 504 may also be referred to as a fabric, compute fabric, or cloud.

Figure 6:
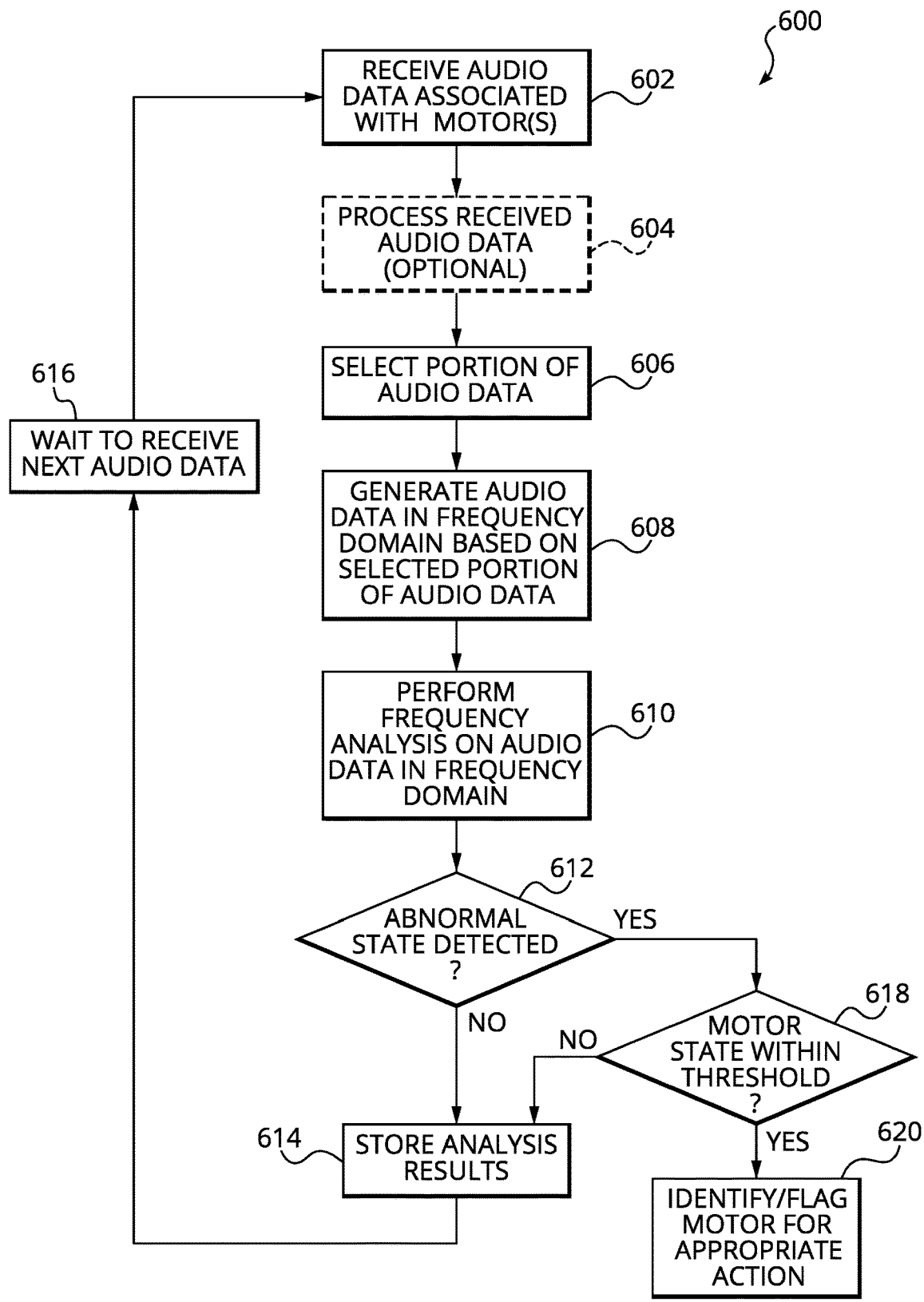
FIG. 6 illustrates an example process implemented by a compute device to perform impending motor failure detection and associated activities in connection with the detected state of one or more motors included in the UAV, in accordance with an embodiment of the present disclosure.

FIG. 6 illustrates an example process 600 implemented by compute device 502 to perform impending motor failure detection and associated activities in connection with the detected state of one or more motors included in the UAV 100, in accordance with an embodiment of the present disclosure.

At a block 602, compute device 502 is configured to receive audio data associated with one or more motors detected by the audio capture device 500. Audio data comprises audio or sound emanating from a particular motor or a particular plurality of motors during operation of the motor(s), which was detected and stored by the audio capture device 500. Audio data comprises a continuous or discrete audio sample of a certain time duration. Audio data comprises data in the time domain and may include related information such as a time stamp, audio capture device identifier, motor(s) identifier, and/or the like.

As described in connection with FIG. 5, in an embodiment, both the audio capture device 500 and compute device 502 can be included in the UAV 100 and UAV 100 can perform self-diagnosis regarding its motor(s). Or the audio capture device 500 can be included in the UAV 100 and compute device 502 is located external to the UAV 100, with audio data from audio capture device 500 provided to the compute device 502 via the network 504 or other communication mechanisms. Alternatively, both the audio capture device 500 and compute device 502 are located remotely from the UAV 100 to detect failure of motor(s) of the UAV 100.

In response to receipt of audio data, compute device 502 is configured to process the received audio data, as needed, at a block 604. Example processing includes, without limitation, filtering, de-noising, converting to a different audio format, and/or the like. If the audio data comprises data for more than one motor, compute device 502 is configured to determine and separate audio data for each of the respective motors. For example, compute device 502 may be able to disambiguate audio data among different motors based on different directionality information associated with respective portions of the audio data, different audio profile for different types of motors, location information of respective motors relative to the audio capture device 500, and/or the like. As another example, a controller included in the UAV 100 can be configured to cause pulsing or surging of each motor to temporarily increase (or otherwise change) the frequency or sound level of each motor at a different time from each other; a plurality of audio capture devices 500 can be used to facilitate triangulation of motor sounds and by extension disambiguation of audio data among different motors; UAV 100 can be moved relative to a single audio capture device 500 to permit identification of a degrading motor, in which each motor of the UAV 100 is placed near the single audio capture device 500 sequentially in time; and/or the like. In some embodiments, block 604 may be optional if processing of audio data is not required.

Next, at a block 606, compute device 502 is configured to select or extract a particular portion of the audio data associated with a motor for analysis (or a particular portion of the audio data for each motor if the audio data is associated with a plurality of motors). The selected portion of the audio data can be a pre-set/nominal time interval of the audio data or a time interval that is different or shifted from the pre-set/nominal time interval. For example, audio data may comprise 2 minutes of audio data and the pre-set/nominal time interval is a 10 second portion of the audio data at time points 0:20-0:30 of the audio sample/clip. If the data at time points 0:20-0:30 is deemed to be undesirable because of noise, wind, interference, low data quality, and/or the like, then a different time point can be selected such as at times 1:20-1:30 of the audio sample/clip. Any of a variety of time points and/or time intervals can be selected from the audio sample/clip. As another example, audio data (or portions of the audio data) when the motor(s) are operating at a consistent or repeatable rotation rate are recorded and analyzed in order to facilitate comparisons over time and between motors and/or UAVs.

The compute device 502 converts the selected portion of the audio data from the time domain to the frequency domain to generate audio data in the frequency domain, at a block 608. Discrete Fourier transform, and in particular, fast Fourier transform (FFT), is applied to the selected portion of the audio data to generate the audio data in the frequency domain.

Figure 7:
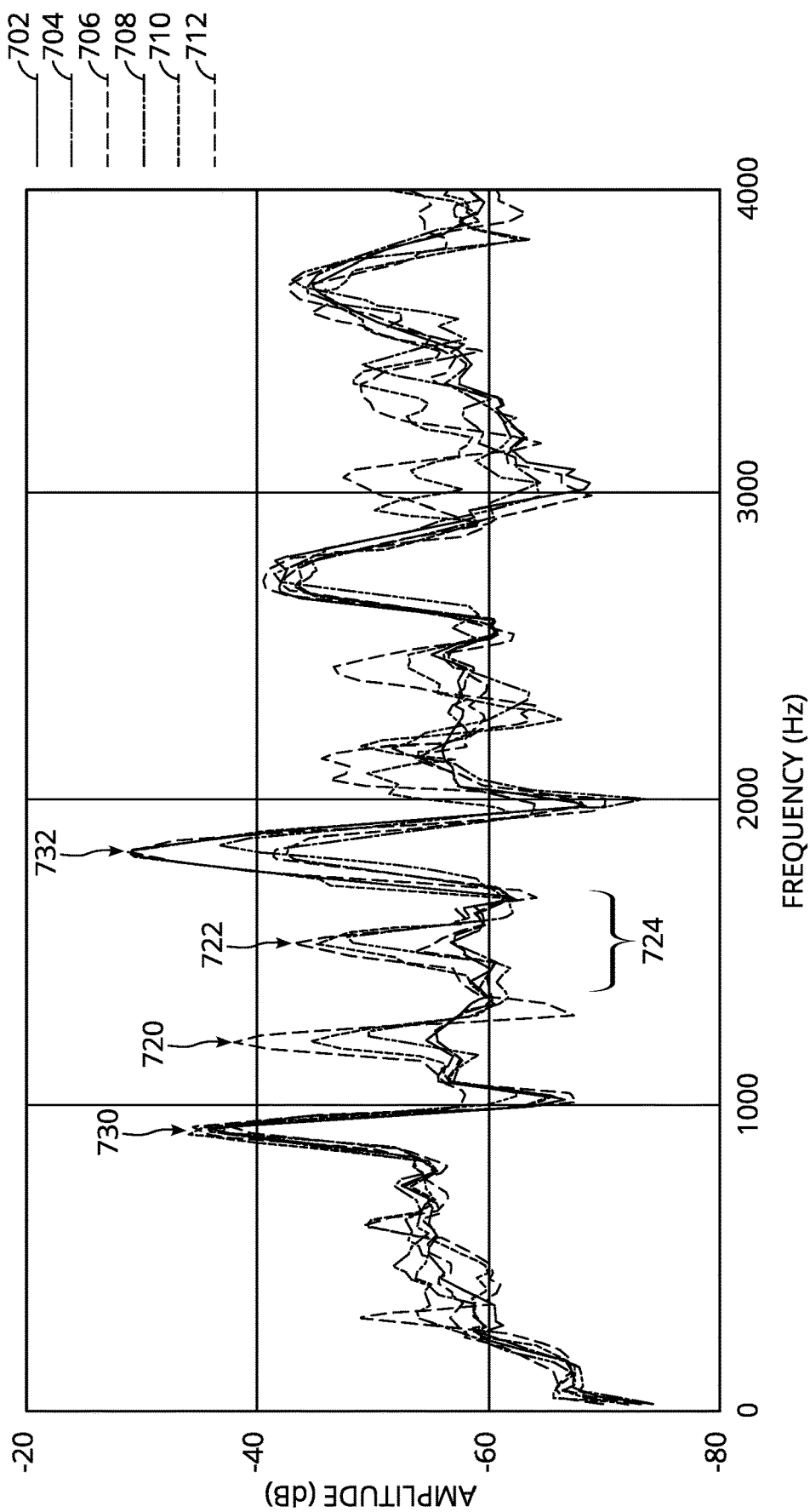
FIG. 7 depicts a graph illustrating example plots of audio data in the frequency domain in accordance with an embodiment of the present disclosure.

FIG. 7 depicts a graph illustrating example plots of audio data in the frequency domain in accordance with an embodiment of the present disclosure. Plots 702-712 represent audio data in the frequency domain for the same motor. Plots 702-712 represents audio data in the frequency domain at respective different life cycle points of the motor, at respective different cumulative operational cycles of the motor, at respective different cumulative operational times of the motor, or at respective different operational points in time of the motor. The plot of amplitude vs. frequency for the current audio data in the frequency domain (from block 608) may be any one of the plots 702-712.

At a block 610, compute device 502 is configured to analyze the audio data in the frequency domain generated at block 608 to determine one or more characteristics associated with motor failure. The analysis can include analyzing the audio data in the frequency domain in conjunction with one or more other audio data in the frequency domain for the same motor (e.g., from previous audio data for the same motor). In an embodiment, for a given motor, particular changes over time of the audio data in the frequency domain indicate impending motor failure (e.g., whether the motor is in an abnormal state, soon-to-fail state, or failure is imminent) and prediction of how close the motor is to (actually) failing relative to the current audio data in the frequency domain. In an embodiment, frequency analysis for each audio data in the frequency domain (e.g., the data corresponding to a selected portion or interval of the audio data from block 606) is performed using a Hamming window technique and 2048 bins.

As an example, compute device 502 can analyze a plurality of audio data in the frequency domain for the same motor such as shown in FIG. 7. In FIG. 7, plots 702-712 are associated with the same motor at 12016, 4816, 1216, 495, 106, and 1 operational cycle remaining before failure, respectively. In an embodiment, the amplitude of plots centered at two frequencies increases inverse to the number of operational cycles remaining before failure of the motor. New peaks 720 and 722 are present or start to be present at frequencies between peaks 730 and 732, which are consistently present through the motor's life cycle (see the existence of peaks 730 and 732 in each of plots 702-712). Peaks 720 and 722 appear at approximately within the last 10% of the motor's life or if the motor has approximately 500 to 1000 operational cycles remaining before (actual) failure.

In FIG. 7, it can be seen that peaks 720 and 722 of appreciable amplitude are present in plots 708 (e.g., associated with 495 operational cycles remaining before failure), plot 710 (e.g., associated with 106 operational cycles remaining before failure), and plot 712 (e.g., associated with 1 operational cycle remaining before failure). The amplitudes of peaks 720 and 722 also increase in time as the motor gets closer to failing (e.g., peaks 720 and 722 have greater amplitude in plot 712 than in plot 710). The center frequencies of peaks 720 and 722 are at approximately 1200 and 1600 Hertz (Hz), respectively. It is understood that for a different motor or different operational profile (e.g., different rotation rate), the center frequency values can be different than 1200 and 1600 Hz.

Figure 8:
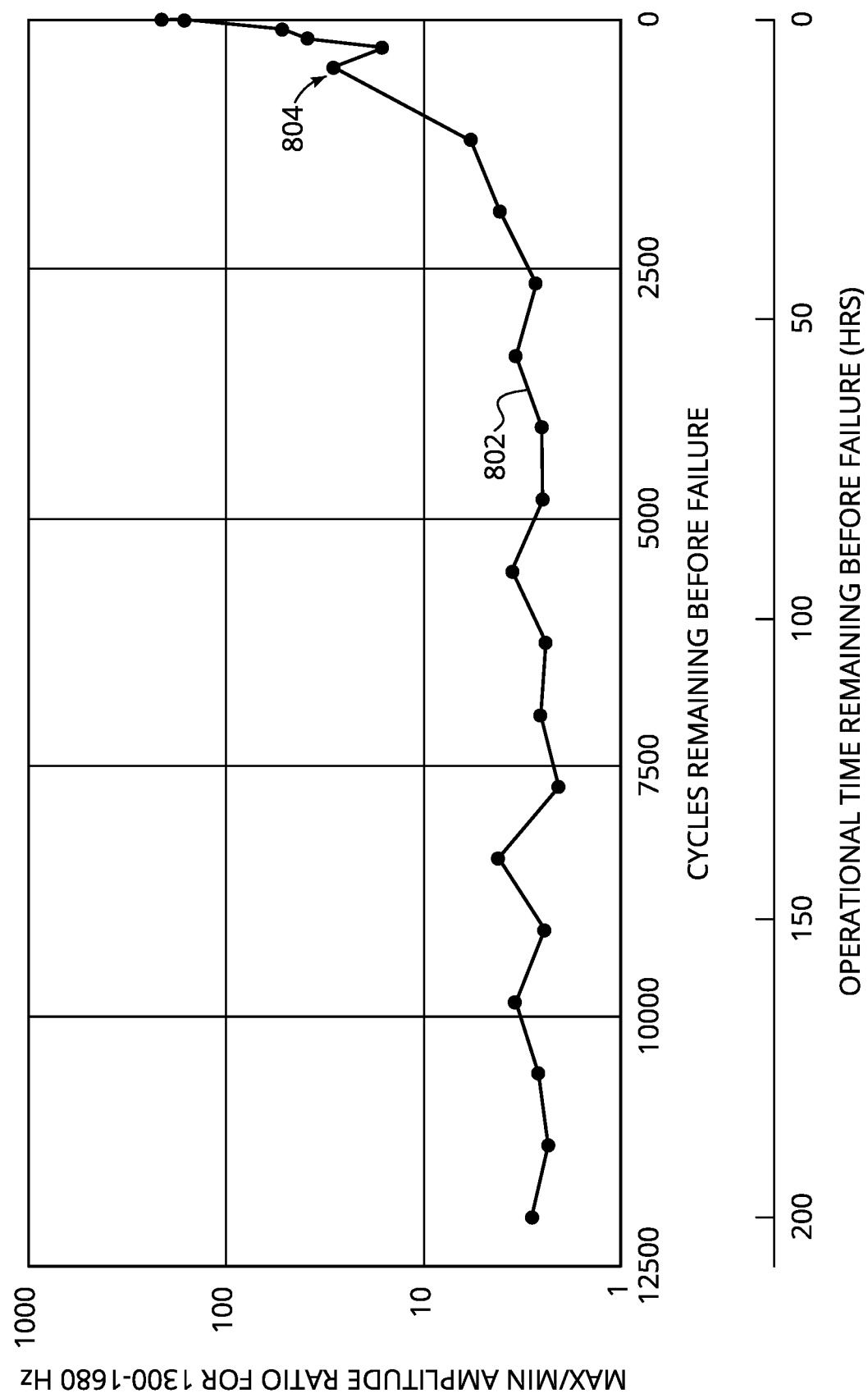
FIG. 8 depicts a plot of maximum to minimum amplitude ratios as a function of operational cycles remaining before failure or operational time remaining before failure, in accordance with an embodiment of the present disclosure.

A region 724 of plots 702-712 is shown as a plot 802 of maximum to minimum amplitude ratios as a function of operational cycles remaining before failure or operational time remaining before failure in FIG. 8, in accordance with an embodiment of the present disclosure. In an embodiment, region 724 is associated with the frequencies of the peak 722 or for a frequency range of approximately 1300 to 1680 Hz. Alternatively, region 724 may be the frequency value of the peak 720.

As shown in FIG. 8, plot 802 is substantially horizontal for most of the motor's life (e.g., has a consistent maximum/minimum amplitude ratio in the approximate range of 3-6) but then rapidly increases in ratio value as the motor approaches failure. A portion 804 of plot 802 associated with the rapidly increasing amplitude ratio occurs when the motor is within approximately 500 operational cycles before failure (or within approximately 10 hours of operation before failure). Portion 804 of plot 802 starts at an approximate ratio of 50 and ends at an approximate ratio of 300. The closer the motor is to failing, the greater the amplitude ratio value. Plots, data points, or other data equivalents similar to plot 802 can exist for each different motor type, model, or configuration to be later accessed for each motor to be monitored.

Since the audio data in frequency domain is of a particular motor at a particular operational cycle of the particular motor, compute device 502 can perform a look up based on the particular motor's identifier information to select a particular plot (or data equivalent) of maximum/minimum amplitude ratio to operational cycle/time remaining to failure matching the particular motor's type, model, or configuration. Then using such particular plot, compute device 502 predicts the current number of operational cycles and/or time remaining before failure for the particular motor based on the current maximum/minimum amplitude ratio value for the particular motor.

Based on the current maximum/minimum amplitude ratio value from the current audio data in the frequency domain, compute device 502 can determine whether the motor is operating in an abnormal or failure imminent state; if in the abnormal/failure imminent state, how close to failing (e.g., number of operational cycles remaining before failure, number of operational time remaining before failure); and/or the like. In an embodiment, motor failure may be due to lateral movement of the bearings between the rotor 304 and stator 306, which causes physical contact and rubbing between the magnets 312 of rotor 304 and the windings 308 of stator 306. The physical contact and rubbing progressively increases over time until motor failure occurs.

In other embodiments, compute device 502 is configured to determine whether the motor is in an abnormal/failure imminent state and/or how close to failing based on analysis of just the current audio data in the frequency domain. For example, if peaks, such as peaks 720 and 722, are present in the current audio data in the frequency domain and such peaks have amplitudes above a pre-set threshold associated with the particular type or model of the motor of interest, then compute device 502 can use such information to make failure determinations about the motor.

In another embodiment, propeller damage, degradation, or fouling may also be detected through similar audio analysis as described herein.

With the frequency analysis complete at block 610, if an abnormal/failure imminent state is not detected (no branch of block 612), then process 600 proceeds to block 614 to store the analysis results and to wait to receive the next audio data for the same motor(s) at block 616. Then process 600 proceeds to return to block 602 to continue monitoring the motor(s) for upcoming failure. If an abnormal/failure imminent state is detected (yes branch of block 612), then process 600 proceeds to block 618. For example, if the current maximum/minimum amplitude ratio value for the motor is above a threshold value (e.g., greater than 50), then the motor is deemed to be in an abnormal/failure imminent state.

At block 618, compute device 502 is configured to determine whether the current state of the motor is such that the motor, and by extension UAV 100, should be flagged for one or more action or restriction. In an embodiment, the predicted number of operational cycles or operational time remaining before failure for the motor based on the current maximum/minimum amplitude ratio value can be compared against a pre-set threshold at block 618. The pre-set threshold value can be the same among the different motors; be different based on different motor types, models, or configurations; can be selected depending on what actions are to be taken to the motor, and by extension UAV 100, if flagged; and/or the like. For example, if the goal is to be conservative about servicing or maintenance so that actual failures do not occur, then the pre-set threshold may be selected to flag motors well before actual failure is likely to occur, perhaps as soon as the first indication of motor failure is detected, such as a pre-set threshold of 500 operational cycles. As another example, if the goal is to maximize the operation of motors without prematurely retiring them, then the pre-set threshold may be set closer to when the motor operational cycle remaining will reach zero, such as a pre-set threshold equal to 100 operational cycles.

If the predicted number of operational cycles remaining before failure is greater than the pre-set threshold (no branch of block 618), then process 600 proceeds to block 614 to continue monitoring. If the predicted number of operational cycles remaining before failure is equal to or less than the pre-set threshold (yes branch of block 618), then process 600 proceeds to block 620.

At block 620, compute device 502 is configured to flag, identify, classify, designate, or otherwise generate an indication that the particular motor, and by extension UAV 100 that includes the particular motor, is to be subject to appreciate action(s) different from normal operations. With the ability to detect and anticipate motor failure, such flagged UAV 100 may be retired to reduce the chance of a hazard that may occur if allowed to continue to operate, restricted or removed from normal use for preventive servicing or maintenance, or designated for short distance missions only or other non-standard use. Safety increases as well as reduced costs associated with premature retiring of the UAV, retrieval of the UAV at unexpected emergency landing locations, damage caused by UAV due to motor failure, and/or the like.

Figure 9:
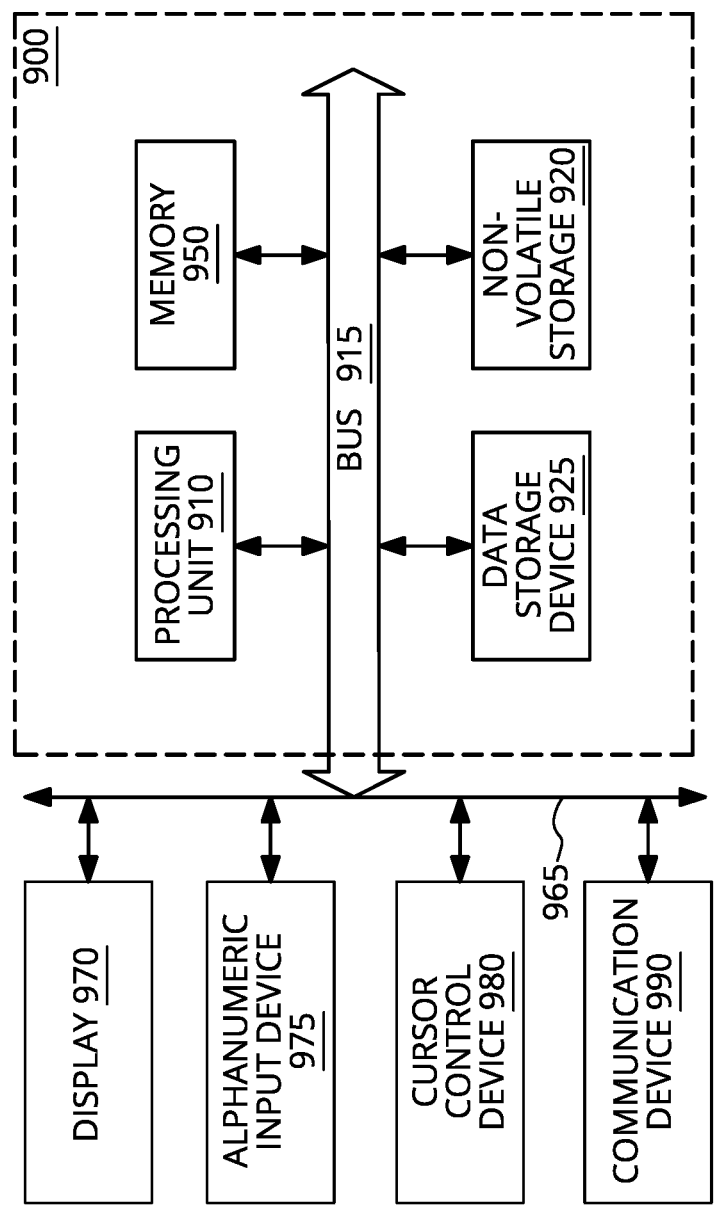
FIG. 9 depicts an example device that may be implemented in the UAV, compute device, audio capture device, or storage facility, in accordance with an embodiment of the present disclosure.

FIG. 9 depicts an example device that may be implemented in the UAV 100, compute device 437 or 502, storage 435, and/or audio capture devices 150, 152, 460, 462, or 500 of the present disclosure, according to some embodiments. The device of FIG. 9 may comprise at least a portion of any of UAV 100, compute device 437 or 502, storage 435, and/or audio capture devices 150, 152, 460, 462, or 500. Platform 900 as illustrated includes bus or other internal communication means 915 for communicating information, and processor 910 coupled to bus 915 for processing information. The platform further comprises random access memory (RAM) or other volatile storage device 950 (alternatively referred to herein as main memory), coupled to bus 915 for storing information and instructions to be executed by processor 910. Main memory 950 also may be used for storing temporary variables or other intermediate information during execution of instructions by processor 910. Platform 900 also comprises read only memory (ROM) and/or static storage device 920 coupled to bus 915 for storing static information and instructions for processor 910, and data storage device 925 such as a magnetic disk, optical disk and its corresponding disk drive, or a portable storage device (e.g., a universal serial bus (USB) flash drive, a Secure Digital (SD) card). Data storage device 925 is coupled to bus 915 for storing information and instructions.

Platform 900 may further be coupled to display device 970, such as a liquid crystal display (LCD) or light emitting diode (LED) display coupled to bus 915 through bus 965 for displaying information to a user. Alphanumeric input device 975, including alphanumeric and other keys, may also be coupled to bus 915 through bus 965 (e.g., via infrared (IR) or radio frequency (RF) signals) for communicating information and command selections to processor 910. An additional user input device is cursor control device 980, such as a mouse, a trackball, stylus, or cursor direction keys coupled to bus 915 through bus 965 for communicating direction information and command selections to processor 910, and for controlling cursor movement on display device 970. In embodiments utilizing a touch-screen interface, it is understood that display 970, input device 975, and cursor control device 980 may all be integrated into a touch-screen unit.

Another component, which may optionally be coupled to platform 900, is a communication device 990 for accessing other nodes of a distributed system via a network. Communication device 990 may include any of a number of commercially available networking peripheral devices such as those used for coupling to an Ethernet, token ring, Internet, or wide area network. Communication device 990 may further be a null-modem connection, or any other mechanism that provides connectivity between platform 900 and the outside world. Note that any or all of the components of this system illustrated in FIG. 9 and associated hardware may be used in various embodiments of the disclosure.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit (ASIC) or otherwise.

A tangible machine-readable storage medium includes any mechanism that provides (e.g., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. One or more computer-readable storage medium comprising a plurality of instructions to cause an apparatus, in response to execution by one or more processors of the apparatus, to:
   receive sounds emanating from one or more motors included in an unmanned aerial vehicle (UAV) during operation of the one or more motors, wherein the one or more motors comprises a vertical or horizontal propulsion motor of the UAV;
   predict a number of operational cycles remaining before the one or more motors is to fail based on analysis of the sounds; and
   based on a determination that the number of operational cycles remaining is not greater than a pre-set threshold, recommending or indicating at least one of disallowing the UAV to continue to operate, performing preventive servicing or maintenance on the UAV, or restricting a distance of missions for the UAV;
   wherein to predict the number of operational cycles remaining before the one or more motors is to fail comprises to:
   convert the sounds to audio data in a frequency domain;
   detect an increase in amplitude at a particular frequency range of the audio data in the frequency domain; and
   calculate an amplitude ratio at the particular frequency range.

2. The computer-readable storage medium of claim 1, wherein to calculate an amplitude ratio at the particular frequency range comprises to:
   calculate a maximum to minimum amplitude ratio at the particular frequency range.

3. The computer-readable storage medium of claim 2, wherein to determine that the number of operational cycles remaining is not greater than a pre-set threshold includes to determine that the calculated maximum to minimum amplitude ratio is greater than a threshold.

4. The computer-readable storage medium of claim 2, wherein the amplitude increases the closer the one or more motors is to failing.

5. The computer-readable storage medium of claim 1, wherein the sounds are detected by one or more audio capture devices included in the UAV.

6. The computer-readable storage medium of claim 1, wherein the sounds are detected by one or more audio capture devices located proximate to a charging station associated with the UAV.

7. The computer-readable storage medium of claim 1, wherein the pre-set threshold indicates approximately a last 10% of life of the one or more motors, approximately 500 operational cycles remaining before the one or more motors is to fail, or approximately 1000 operational cycles remaining before the one or more motors is to fail.

8. A system comprising:
   an audio capture device configured to detect audio emanating from one or more motors during operation of the one or more motors; and
   a compute device in communication with the audio capture device, wherein the compute device is configured to predict a number of operational cycles remaining before the one or more motors fails based on the audio received from the audio capture device and, based on a determination that the number of operational cycles remaining is not greater than a pre-set threshold, recommend or indicate at least one of disallowing the one or more motors to continue to operate, performing preventive servicing or maintenance on the one or more motors, or restricting a distance of missions for the one or more motors;
   wherein the audio comprises first audio at a first time period,
   wherein the audio capture device is configured to detect second audio emanating from the one or more motors during operation of the one or more motors at a second time period later than the first time period,
   wherein the compute device is configured to predict the number of operational cycles remaining before the one or more motors fails based on differences between the first and second audio,
   wherein the compute device is configured to determine an amplitude ratio value based on at least a portion of the first and second audio, and wherein the prediction of the number of operational cycles remaining before the one or more motors fails is based on the amplitude ratio value.

9. The system of claim 8, wherein the one or more motors comprises first and second motors, and wherein the audio comprises audio emanating simultaneously from the first and second motors.

10. The system of claim 9, wherein the compute device is configured to identify, from the audio, a first portion of audio data associated with the first motor and a second portion of audio data associated with the second motor, and wherein the compute device is configured to predict a first number of operational cycles remaining before the first motor fails based on the first portion of the audio data and predict a second number of operational cycles remaining before the second motor fails based on the second portion of the audio data.

11. The system of claim 9, wherein the first and second motors comprise vertical or horizontal propulsion motors included in an unmanned aerial vehicle (UAV).

12. The system of claim 11, wherein the first motor comprises a motor included in a vertical propulsion unit of the UAV, a motor included in a horizontal propulsion unit of the UAV, or a motor included in a payload module of the UAV.

13. The system of claim 11, wherein one or both of the audio capture device or the compute device is included in the UAV.

14. The system of claim 11, wherein the audio capture device and the compute device are remote from the UAV.

15. The system of claim 8, wherein the compute device is configured to predict the number of operational cycles remaining before the one or more motor fails based on the audio converted into audio data in a frequency domain.

16. The system of claim 8, wherein determining the amplitude ratio value based on at least a portion of the first and second audio includes determining a maximum to minimum amplitude ratio value based on at least a portion of the first and second audio.

17. The system of claim 8, wherein the pre-set threshold is within approximately the last 10% of life of the one or more motors.

18. The system of claim 8, wherein the compute device is configured to determine an imminent failure state based on an amplitude of the audio at a particular frequency value or range being above a threshold.

19. A system comprising:
an audio capture device configured to detect audio emanating from one or more motors during operation of the one or more motors; and
a compute device in communication with the audio capture device, wherein the compute device is configured to:
predict a number of operational cycles remaining before the one or more motors is to fail based on analysis of the audio received from the audio capture device and, based on a determination that the number of operational cycles remaining is not greater than a pre-set threshold, recommending or indicating at least one of disallowing the UAV to continue to operate, performing preventive servicing or maintenance on the UAV, or restricting a distance of missions for the UAV;
wherein to predict the number of operational cycles remaining before the one or more motors is to fail comprises to:
convert the sounds to audio data in a frequency domain;
detect an increase in amplitude at a particular frequency range of the audio data in the frequency domain; and
calculate an amplitude ratio at the particular frequency range.

20. One or more computer-readable storage media comprising a plurality of instructions to cause an apparatus, in response to execution by one or more processors of the apparatus, to:
receive sounds emanating from one or more motors included in an unmanned aerial vehicle (UAV) during operation of the one or more motors, wherein the one or more motors comprises a vertical or horizontal propulsion motor of the UAV;
predict a number of operational cycles remaining before the one or more motors is to fail based on analysis of the sounds; and
based on a determination that the number of operational cycles remaining is not greater than a pre-set threshold, recommending or indicating at least one of disallowing the UAV to continue to operate, performing preventive servicing or maintenance on the UAV, or restricting a distance of missions for the UAV;
wherein the received sounds emanating from the one or more motors include first audio emanating from the one or more motors during operation of the one or more motors at a first time period and second audio emanating from the one or more motors during operation of the one or more motors at a second time period later than the first time period;
wherein predicting the number of operational cycles remaining before the one or more motors is to fail based on analysis of the sounds includes predicting the number of operational cycles remaining before the one or more motors fails based on differences between the first audio and the second audio;
wherein the instructions further cause the apparatus to determine an amplitude ratio value based on at least a portion of the first and second audio; and
wherein the prediction of the number of operational cycles remaining before the one or more motors fails based on differences between the first audio and the second audio is based on the amplitude ratio value.

* * * * *